(12) United States Patent
Luyck

(10) Patent No.: US 11,598,591 B2
(45) Date of Patent: Mar. 7, 2023

(54) HEAT EXCHANGER AND METHOD FOR MANUFACTURING A HEAT EXCHANGER CORE WITH MANIFOLD

(71) Applicant: Bosal Emission Control Systems NV, Lummen (BE)

(72) Inventor: Martijn Luyck, Hasselt (BE)

(73) Assignee: BOSAL EMISSION CONTROL SYSTEMS NV, Lummen (BE)

( * ) Notice: Subject to any disclaimer, the term of this patent is extended or adjusted under 35 U.S.C. 154(b) by 0 days.

(21) Appl. No.: 17/742,630

(22) Filed: May 12, 2022

(65) Prior Publication Data

US 2022/0268534 A1 Aug. 25, 2022

Related U.S. Application Data

(62) Division of application No. 16/380,393, filed on Apr. 10, 2019, now Pat. No. 11,359,873.

(30) Foreign Application Priority Data

Apr. 19, 2018 (EP) ..................... 18168335

(51) Int. Cl.
*F28F 9/02* (2006.01)
*B23P 15/26* (2006.01)
(Continued)

(52) U.S. Cl.
CPC ............ *F28F 9/0275* (2013.01); *B23P 15/26* (2013.01); *F28D 9/00* (2013.01); *F28F 3/00* (2013.01)

(58) Field of Classification Search
CPC ........ F28F 9/0275; F28F 3/00; F28F 2275/06; F28D 9/00; B23P 15/26
(Continued)

(56) References Cited

U.S. PATENT DOCUMENTS 1,662,870 A * 3/1928 Stancliffe ............... F28D 9/0037
165/DIG. 392
5,469,914 A * 11/1995 Davison ................. F28D 9/0037
165/165
(Continued)

FOREIGN PATENT DOCUMENTS

CN 103502761 A 1/2014
CN 106104191 A 11/2016
(Continued)

OTHER PUBLICATIONS

Office Action for Chinese Patent Application No. 201910308915.1 (dated Jan. 11, 2022).
(Continued)

*Primary Examiner* — Jon T. Schermerhorn, Jr.
(74) *Attorney, Agent, or Firm* — Merchant & Gould P.C.

(57) ABSTRACT

The invention relates to a heat exchanger comprising first fluid inlets, first fluid outlets, second fluid inlets and second fluid outlets. Each of the first fluid inlets, the first fluid outlets, the second fluid inlets and the second fluid outlets are arranged on four different sides of a heat exchanger core. A manifold covers one of the four different sides of the heat exchanger core, wherein a first sidewall of the manifold is arranged at an angle smaller than 90 degree to the one side of the heat exchanger core which is covered by the manifold. An edge of the heat exchanger core between the one side of the heat exchanger core which is covered by the manifold and a neighbouring side of the four different sides of the heat exchanger core forms a common weld line with a connecting edge of the first sidewall of the manifold. The invention also relates to a method for manufacturing a heat exchanger comprising a heat exchanger core and a manifold.

10 Claims, 3 Drawing Sheets

(51) Int. Cl.
*F28D 9/00* (2006.01)
*F28F 3/00* (2006.01)
(58) Field of Classification Search
USPC .......................................................... 165/166
See application file for complete search history.

(56) References Cited

U.S. PATENT DOCUMENTS

| | | | |
|---|---|---|---|
| 6,516,874 B2* | 2/2003 | Mathur | F28D 9/0037 |
| | | | 165/170 |
| 10,926,364 B2* | 2/2021 | Thresher | B23H 1/00 |

FOREIGN PATENT DOCUMENTS

| | | | |
|---|---|---|---|
| CN | 107514649 A | 12/2017 | |
| EP | 1376041 A2 | 1/2004 | |
| EP | 3217132 A1 | 9/2017 | |
| FR | 2497565 A1 | 7/1982 | |
| JP | H06-3076 A | 1/1994 | |

OTHER PUBLICATIONS

Search Report for European Patent Application No. 18168335.0, dated Oct. 1, 2018.

* cited by examiner

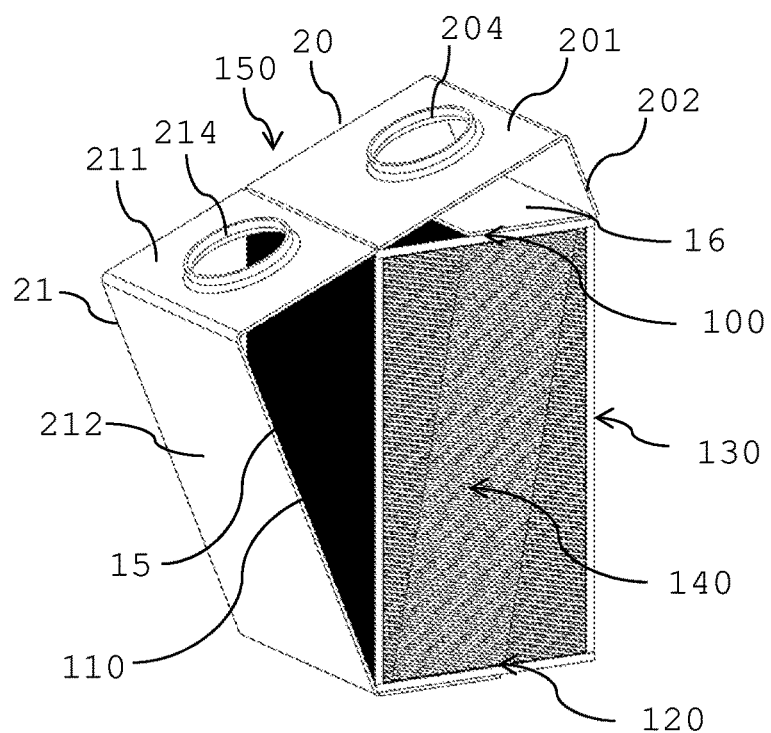
Fig. 4
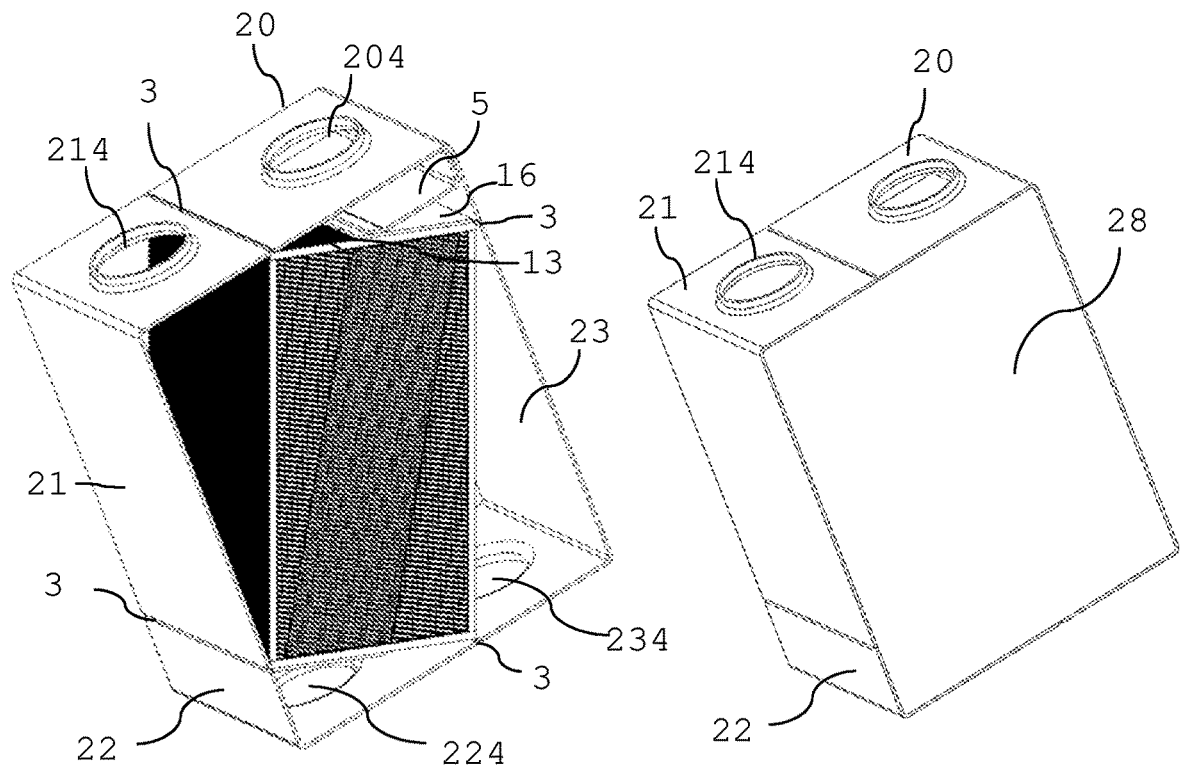
Fig. 5
Fig. 6

HEAT EXCHANGER AND METHOD FOR MANUFACTURING A HEAT EXCHANGER CORE WITH MANIFOLD

REFERENCE TO RELATED APPLICATIONS

This application is a divisional application of U.S. patent application No. 16/380,393, filed on 10 Apr. 2019, now U.S. Pat. No. 11,359,873, which claims the benefit of EP Application No. 18168335.0, filed on 19 Apr. 2018 in the European Patent Office, the disclosures of which are incorporated herein by reference in their entirety.

The invention relates to a heat exchanger and a method for manufacturing a heat exchanger core with manifold, in particular it relates to a plate heat exchanger and a method for manufacturing a plate heat exchanger with manifold.

In heat exchangers, in particular in heat exchangers, where individual heat exchanger cells are stacked to form a heat exchanger stack, the inlets and outlets for the different fluid flows are combined in collectors, so called manifolds for having a single supply conduit and single discharge conduit for each of the fluids. Construction of manifolds and their mounting with a heat exchanger core is often elaborate and costly.

Therefore, there is a need for a heat exchanger with simple manifold allowing to lower the production cost of the heat exchanger.

According to the invention, there is provided a heat exchanger comprising first fluid inlets, first fluid outlets, second fluid inlets and second fluid outlets, each of the first fluid inlets, the first fluid outlets, the second fluid inlets and the second fluid outlets being arranged on four different sides of a heat exchanger core. The heat exchanger further comprises a manifold covering one of the four different sides of the heat exchanger core. The manifold is provided for collecting fluid from the first or second outlets to a common outlet in the manifold or for directing a fluid from a common inlet in the manifold to the first or second fluid inlets of the heat exchanger core.

A first sidewall of the manifold is arranged at an angle smaller than 90 degree to the one side of the heat exchanger core which is covered by the manifold. Thus, the manifold is not connected to the heat exchanger core by a common perpendicular arrangement of manifold or manifold sidewalls and heat exchanger core side.

An edge of the heat exchanger core between the one side of the heat exchanger core which is covered by the manifold and a neighbouring side of the four different sides of the heat exchanger core forms a common weld line with a connecting edge of the first sidewall of the manifold. Thereby, the heat exchanger core is welded at and along the common weld line and the manifold is welded to the heat exchanger core by the same common weld line. The welding of the heat exchanger core at the edge is preferably performed in the same manufacturing step than the welding of the manifold to the heat exchanger core.

By a common weld line manufacturing may be simplified by reducing welding steps. By the application of the manifold to the side of the heat exchange core in an angled manner, further welding steps may be omitted since manifolds may directly be connected to each other and simple forms of manifolds may be formed as will be outlined in more detail below. This may reduce material costs as well as manufacturing steps of manifolds. In addition, simple manifold shapes allow to uniformly guide fluids, in particular gases, in manifolds without causing high pressure drop. The angled application of the manifold to the heat exchanger core also allows to design very simple arrangements of heat exchangers including manifolds that may simplify for example, installation, thermal insulation or reinforcement for high pressure applications of the heat exchanger.

The heat exchanger comprises a stack heat exchanger core, wherein preferably several heat exchanger cells are combined to one heat exchanger core. Preferably, the heat exchanger comprises a stack of heat transfer plates.

In preferred embodiments the heat exchanger comprises a stack of heat transfer plates, wherein first flow channels and second flow channels are provided in between the heat transfer plates by arranging spacing elements between the heat transfer plates. The spacing elements extend along four edge parts of the heat transfer plates leaving open the first fluid inlets, the first fluid outlets, the second fluid inlets and the second fluid outlets. The spacing elements are welded to the heat transfer plates along the four edge parts. Preferably, the welding is performed entirely along the four edge parts in order to prevent leakage of the fluid guided through the conduits. However, the welding may at specific locations also be partly in order to define a wanted amount of leakage. In the stack heat exchanger, the edge of the heat exchanger core that forms a common weld line with the connecting edge of the manifold is one of four edges or corners extending along and formed by the entirety of the stacked heat transfer plates with spacing elements in between. The common weld line essentially extends over the height of a stack. By welding a connecting edge of the manifold to one of the four edges of the stack, the heat exchanger stack or heat exchanger core is also welded along the one of the four edges forming the common weld line.

Preferably, in the present invention a heat exchanger stack as described in EP 3 217 132 is used in combination with the manifold described herein. The disclosure of EP 3 217 132 is herewith incorporated by reference. In particular, the elements of the heat exchanger stack, the material and positioning of the elements of the stack, the location and way of welding may be performed and selected as described in EP 3 217 132 and are herewith incorporated by reference.

In the heat exchanger of EP 3 217 132 a plate stack is welded along the edges of the stack over the entirety of the plates forming the stack, thus over the entire height of a stack. This is done in order to inhibit leaks between the first and second conduits and thus a heat exchange or mixing of the two fluids guided in and through the heat exchanger. In the present invention, these welds combining the plate edges and intermediate spacing elements may directly be combined with the welding of one or several manifolds to the heat exchanger core.

Preferably, one manifold is welded to the heat exchanger core at the same time than the edge of the heat exchanger core is welded, thereby creating one common weld line. By this the heat exchanger is made fluid-tight, preferably gas-tight at the edge and the manifold is attached to the heat exchanger core. More preferably, two neighbouring manifolds are welded to an edge of the heat exchanger core at the same time than the edge of the heat exchanger core is welded. Preferably, the welding is done in one single welding process step.

Preferably, the heat exchanger comprises a further manifold covering a second side of the four different sides of the heat exchanger core adjacent to the one side covered by the manifold. A connecting edge of a first sidewall of the further manifold is then welded to the connected edge of the manifold and the edge of the heat exchanger core. The connecting edge of the further manifold then also forms part of the common weld line. By this, two neighbouring manifolds may be connected to one edge of the heat exchanger core as well as to each other. This may be done in two or preferably in one single welding step.

Preferably, the first sidewall of the further manifold is arranged at an angle smaller than 90 degree to the (second) side of the heat exchanger which is covered by the further manifold. The angled arrangement of the two manifolds not only allows a simpler manufacturing process but also a simple design of heat exchanger core and manifold. For example, neighbouring manifolds may be arranged such as to create smooth outer transitions from one manifold to a neighbouring manifold.

Preferably, a first sidewall of the manifold and a first sidewall of the further neighbouring manifold are arranged in a same plane. Preferably, the first sidewalls of the manifolds each comprise one common opening. The common opening may be a common inlet or a common outlet in fluid connection with the inlet openings or outlet openings of the heat exchanger core. By this arrangement, the two common openings may be arranged next to each other and in a same plane. This simplifies the tubing of the heat exchanger and accessibility of the common inlets and common outlets.

A manifold of the present invention is of a very simple construction. A connecting edge of the manifold is welded to an edge of the one side of the heat exchanger core covered by the manifold and another connecting edge of the manifold is welded to the opposite edge of the side covered by the manifold.

Preferably, a manifold comprises a first sidewall comprising a common opening and comprises a second sidewall. The first and second sidewalls are connected, for example formed from a rectangular piece of sheet material.

Preferably, a first sidewall or a second sidewall, more preferably a first sidewall and a second sidewall are each formed by a single plane. A first sidewall comprises a common opening, which opening may comprise a collar extending out of the plane of the first sidewall. Preferably, a connecting edge of the first sidewall of the manifold is welded to an edge of the one side of the heat exchanger core covered by the manifold and a connecting edge of the second sidewall of the manifold is welded to the opposite edge of the side covered by the manifold. The connecting edges of the first and second sidewalls are preferably arranged at opposite ends of a piece of sheet material forming the manifold.

Preferably, the connecting edge of the second sidewall forms a common weld line with an edge of the heat exchanger between the one side of the heat exchanger which is covered by the manifold and another opposite neighbouring side of the four different sides of the heat exchanger stack. By this, welding steps for two edges of the heat exchanger core may directly be combined with the attachment of the manifold to the heat exchanger core.

Preferably, a manifold consist of a first sidewall comprising a common opening and a second sidewall.

First and second sidewalls include an angle smaller than 180 degree. Preferably, first and second sidewalls include an angle in a range between 60 degree and 140 degree, more preferably, in a range between 80 degree and 120 degree, most preferably 90 degree. An angle may be chosen and adapted in order to optimise a flow through the manifold, for example also depending on the position and size of a common opening arranged in the manifold.

Preferably, the manifold has a shape of an asymmetric roof. The manifold comprises two sidewalls, wherein a first sidewall has a larger or smaller cross section than a second sidewall of the manifold. Since one dimension of the manifold is given by the dimension of the heat exchanger stack, the two sidewalls basically differ in a length, depending on the size of an angle formed between the two sidewalls. The manifold may be made of a single piece of sheet material, for example stainless steel. One of the two sidewalls comprises a common opening, which forms a common inlet or common outlet for a fluid guided through the heat exchanger.

An angle between a sidewall of the manifold and the side of the heat exchanger covered by the manifold is preferably smaller than 90 degree. Thus, the two base angles of the triangle spanned by the first and second sidewalls of the manifold and the side of the heat exchange core are both preferably smaller than 90 degree. Preferably, the manifold is asymmetric such that the two base angles are not equal. One base angle may, for example, be in a range between 20 degree and 40 degree and the other base angle may be in a range between 50 degree and 80 degree. In any case, the sum of the base angles and the top angle amounts to 180 degree.

Preferably, each one of the four different sides of the heat exchanger core, the sides comprising the first fluid inlets, the first fluid outlets, the second fluid inlets and the second fluid outlets, is covered by a manifold. Preferably, each manifold shares a common weld line with its neighbouring manifold and with two edges of the heat exchanger core.

The two opposite sides of the heat exchanger core that are not covered by a manifold may each be covered by a side plate. The side plates preferably close a volume spanned by the manifolds on opposite sides of the manifolds. Thus, manifolds and side plates envelope the heat exchanger core. The two side plates are preferably connected, for example welded, to the manifolds along the entire circumference of the side plates. The two side plates may also be fixed, for example welded, to the heat exchanger core, for example along two opposite end lines of the heat exchanger core. This may further stabilize the heat exchanger construction.

The heat exchanger according to the invention may be manufactured in less welding steps than conventional heat exchanger with manifolds, thus reducing production costs. Depending on the shape and arrangement of the manifolds, the heat exchanger may also be given a simple outer form, thus facilitating application and installation of the heat exchanger.

Preferably, the heat exchanger with mounted manifolds has the form of a rectangular heat exchanger box. The heat exchanger box comprises a common opening in each of the manifolds. Preferably, two common openings are arranged on one side of the heat exchanger box and two further common openings are arranged on an opposite side of the heat exchanger box. This not only provides good accessibility to the common openings as already mentioned. The up to four flat sides of the heat exchanger box allow for variations in the installation of the heat exchanger. The flat sides may very easily also be provided with reinforcements for example for high pressure applications of the heat exchanger and/or thermal insulation.

If one of the fluid flows in the heat exchanger is pressurized, thus having a pressure of 1.5 bar or higher, a reinforcement may be provided. Reinforcement may be provided, for example, for the heat exchanger to be compliant with national or international regulations, for example, with the European Pressure Directive (PED) for high pressure applications.

If the pressure of the fluids in the heat exchanger is below 1.5 bar reinforcement may be omitted and is preferably omitted.

The heat exchanger may comprise an external thermal insulation and reinforcement. Thermal insulation and reinforcement may be combined in one element or may be provided in separate elements. In particular, in high pressure applications, wherein a fluid in the heat exchanger, in particular a gas, has pressures above 1.5 bar, for example between 5 bar and 10 bar, side plates may be reinforced in order to prevent or reduce deformation.

The heat exchanger according to the invention may be used in high temperature applications, in particular high temperature applications, wherein one of two fluids may have temperatures up to about 1000 degree Celsius. The fluids may be gases or liquids, or one may be a gas and another one may be a liquid. Preferably, a first fluid is a gas. Preferably the first fluid is a heat absorbing fluid or cool fluid. Preferably, a second fluid is a gas. Preferably, the second fluid is a heat emitting fluid or hot fluid. Temperatures of the hot fluid may be up to about 1000 degree Celsius, for example may be between 600 Celsius and 950 degree Celsius.

In order to improve thermal effectiveness of the heat exchanger, the heat exchanger may be provided with one or several thermal shields. A thermal shield is arranged within a space between a manifold and the side of the heat exchanger core covered by the manifold. Preferably, the thermal shield keeps a fluid flow from contacting a portion of the side of the heat exchanger core covered by the manifold. By this, no or less heat exchange may occur between the fluid in the manifold and that portion of the side of the heat exchanger core. Preferably, the thermal shield is arranged to prevent or limit a contact between a fluid in the manifold and the portion of the side covered by the manifold, which portion of the side of the heat exchanger core is closed by a side plate. Thus, the thermal shield does not cover the portion of the side of the heat exchanger core that is formed by the fluid inlets or fluid outlets. A thermal shield may also be a flow directing element, directing a fluid flow from a common inlet in the manifold to fluid inlets in the heat exchanger core or directing a fluid flow from fluid outlets in the heat exchanger core to a common outlet in the manifold.

There is also provided a method for manufacturing a heat exchanger comprising a heat exchanger core with manifold. The method comprises the steps of providing a stack of heat transfer plates, with the heat transfer plates extending in a general plane and comprising four edge parts, and providing first flow channels and second flow channels between the heat transfer plates by arranging spacing elements between the heat transfer plates. The spacing elements extend along the four edge parts of the heat transfer plates leaving open first inlets, first outlets, second inlets and second outlets each arranged on four different sides of the stack. The method further comprises the step of welding spacing elements to heat transfer plates along the four edge parts, thereby forming a heat exchanger core. The heat exchanger core has four edges extending along and formed by the entirety of the stacked heat transfer plates with spacing elements in between. The method further comprises the steps of providing a manifold and covering one side of the four different sides of the heat exchanger core with the manifold and welding a connecting edge of the manifold to one of the four edges of the heat exchanger core, thereby welding the heat exchanger core along the one of the four edges and forming a common weld line with the connecting edge of the manifold.

Advantages of the method have been described relating to the heat exchanger and will not be repeated.

Preferably, the method further comprises the steps of providing a further manifold covering a further, neighbouring side of the four different sides of the heat exchanger core with the further manifold; and welding a connecting edge of the further manifold to the connecting edge of the manifold and to the one of the four edges of the heat exchanger core, thereby forming the common weld line between manifold, further manifold and the one edge of the heat exchanger core.

The method may comprise the steps of providing four manifolds, covering each one of the four different sides of the heat exchanger core with one of the four manifolds, and welding each two of connecting edges of manifolds to each other and to one of the four edges of the heat exchanger core. While each welding may be performed separately, welding an edge of the heat exchanger core and connecting a manifold to the heat exchanger core is preferably performed in one welding step. Also the connecting of two neighbouring manifolds to each other and to the heat exchanger core may be performed in separate welding steps, however, it is preferably performed in one single welding step.

Preferably, the method comprises the step of arranging and designing the four manifolds around the heat exchanger core, thereby forming a heat exchanger box. The heat exchanger box comprises a common opening in each of the four manifolds. The method preferably further comprises the step of arranging two common openings on one side of the heat exchanger box and two further common openings on an opposite side of the heat exchanger box.

The invention is further described with regard to embodiments, which are illustrated by means of the following drawings, wherein:

FIG. 4,5 are perspective views onto the heat exchanger core with two manifolds (FIG. 4) and four manifolds (FIG. 5);

FIG. 6 is a perspective view onto the heat exchanger of FIG. 5 comprising side plates;

In the drawings, the same reference sign are used for the same or similar elements.

Figure 1:
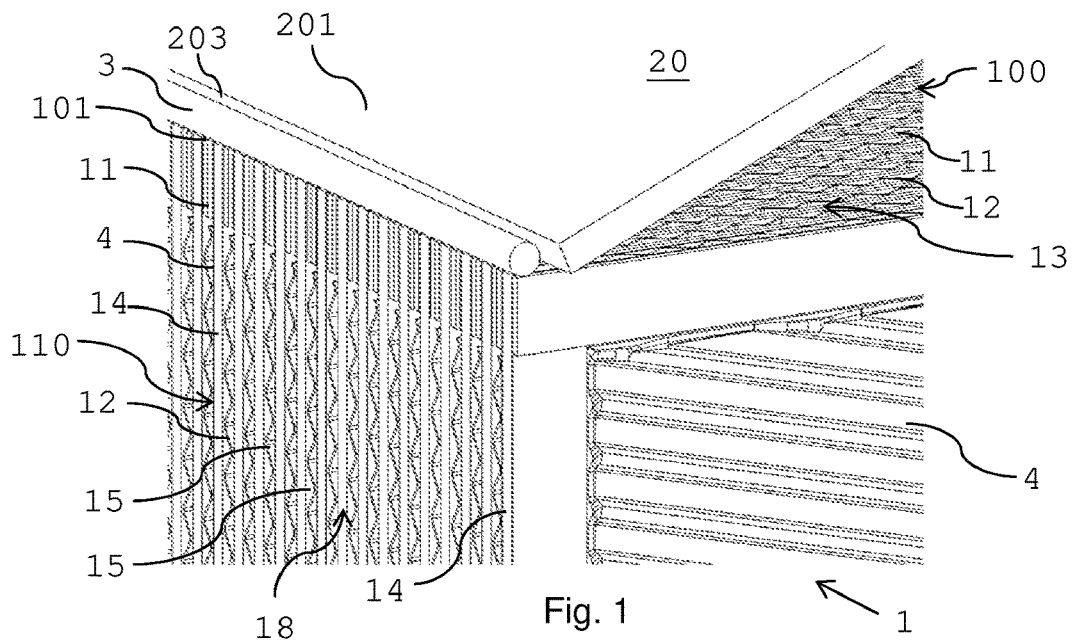
FIG. 1 shows a partial view of a common weld line of manifold and heat exchanger core.

FIG. 1 shows a partial view onto a plate heat exchanger core 1 comprising a stack of rectangular heat transfer plates divided by spacing elements 11,14 to form channels in between the heat transfer plates 4. The plates 4 may not be seen in between the spacing elements 14 due to the small thickness of about 0.15 mm of the plates compared to the thickness of the spacing elements 14 of 1 mm and the spacing elements 11, which form double spacers.

In the stack of the heat exchanger shown in FIG. 1, the rectangular plates are arranged vertically. For example, 20 to 30 plates may be arranged above or next to each other to form a stack.

A first fluid, preferably a cooling gas, may enter the stack at a first inlet port section 13 on a first one 100 of four sides of the stack. After having passed the stack by flowing through first channels, the first fluid may leave the heat exchanger at the opposite third side 120 (in the figure on the bottom not shown).

A second fluid, preferably a hot gas, may enter the stack at a second inlet port section 18 on a second side 110 of the stack. After having passed the stack by flowing through second channels, the second fluid may leave the heat exchanger at the opposite fourth side 130 (not shown in FIG. 1)

A manifold 20, wherein only part of a first sidewall 201 is shown is welded to the heat exchanger core 1. A common weld line 3 is formed between a connecting edge 203 of the first sidewall 201 of the manifold 20 and the edge 101 of the heat exchanger. The common weld line 3 tightly connects the heat transfer plates 4 of the heat exchanger core and the spacing elements 11 along the edge 101. The common weld line 3 also connects the manifold 20 the edge 101 of the heat exchanger stack.

The heat exchanger core 1 is preferably a heat exchanger stack as described in EP 3 217 132. A heat transfer plate 4 forms one side of the stack comprising a half-spacer 11 along a top edge. This spacer may serve to be welded to a side plate as will be described further below. The profile of the heat transfer plates 4 may well be seen: a center of the plates comprising profiles to improve fluid distribution and collection is framed by flat plate portions. On the next level, the second side 110 is closed by a spacer 14 welded through horizontal welding to the heat transfer plate 4 above and below the spacer 14. The first side 100 is open and provided with a corrugated sheet 12, which may extend over the inlet openings or may extend along the entire side 100. This first channel is closed by the next heat transfer plate 4. In a further layer the first side 100 is closed by a spacer 11, while the second side 110 is open and provided with a corrugated sheet 12. This second channel is closed again by a further heat transfer plate 4. The spacer 14 of the further layer is welded in a horizontal manner to this further heat transfer plate 4.

The next level is a repetition of the first channel and formed accordingly, while the level after the next is a repetition of the second channel.

Between the spacers 11,14 and the heat transfer plates 4 weld joints are provided along the edge parts along an entire side of the heat transfer plate. Weld joints are also provided between spacers 11,14 and the heat transfer plate 4 on the sides of the stack not comprising the first and second inlet openings 15.

No weld joints are provided between the corrugated sheets and the heat transfer plates 4, such that leakage passageways are formed between said non-welded corrugated sheets 12 and heat transfer plates 4. No welds exist between the two spacing elements 11,14 thus a sealing along the common weld line 3 is required to close the edge portion between the two fluid channels.

The spacers 11 of the second fluid channel are part of a double spacer defining the distance of two heat transfer plates 4 and the height of the second channel. Preferably, the double spacer 11 is formed upon stacking cells to each other each cell having a spacer 11 arranged on its outside. Further details of the arrangement of spacers and the horizontal welding is described in EP 3 217 132 and incorporated herewith by reference.

Figure 2:
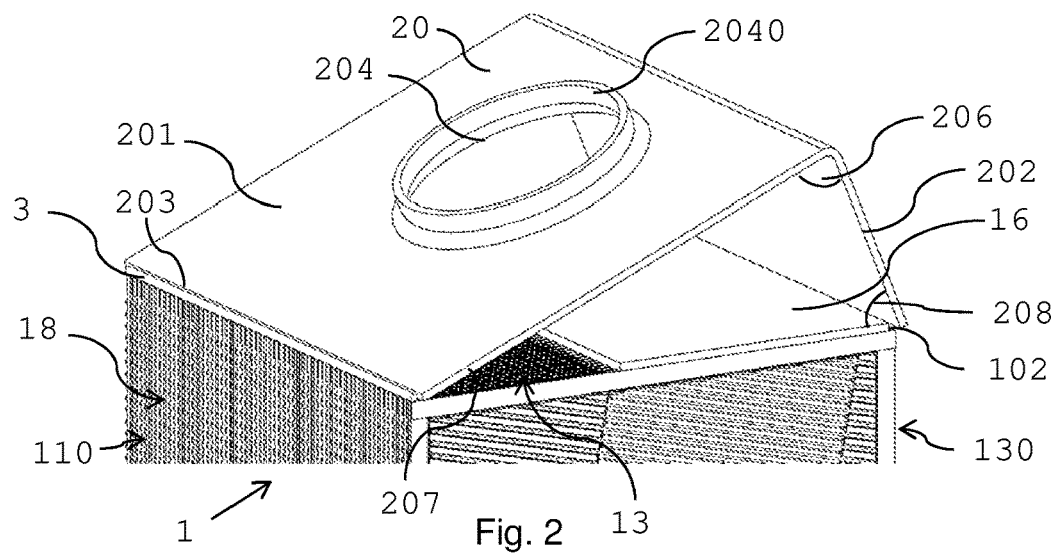
FIG. 2 shows a manifold mounted to a plate heat exchanger.

FIG. 2 shows a manifold 20 mounted to a plate heat exchanger 1.

A first cover plate 16 covers the top or first side 100 of the heat exchanger but for the inlet port section 13. The first outlet port section (not shown) is constructed likewise but on the opposite side of the heat exchanger. This cover plate set-up may be used for embodiments of a heat exchanger, where an open inner spacing element, such as a corrugated sheet 12, is arranged along entire sides of the heat exchanger. The sizes of the inlet and outlet port sections are then mainly defined by the arrangement of the cover plate. This cover plate set-up may also be used for embodiments of the heat exchanger, where no spacing element or an open inner spacing element, such as a corrugated sheet, is solely arranged in the inlet or outlet openings, that is, along a portion of the sides of the heat exchanger core only. The inlet port section 13 is then mainly defined by the inlet openings.

The cover plate 16 (and opposite side of the stack accordingly) covers about ⅔ or ⅘ of the top side 100 of the stack.

The inlet port section 18 extends over the entire length (height in the drawing) of the heat exchanger core 1. The corresponding outlet port section (not shown) arranged on the opposite side 130 of the heat exchanger core extends also over the entire length (height in the drawing) of the heat exchanger core 1. The two fluids are guided in alternating first and second channels through the stack and essentially parallel to each other.

Cover plates 16 are welded to the stack along corner parts.

The manifold 20 covers the top side 100 of the heat exchanger stack. The manifold 20 has the form of a roof, wherein the larger first sidewall 201 of the roof comprises a common inlet 204. The common inlet 204 comprises a collar 2040 for application of an inlet tube. The collar may be integrally formed of the manifold, for example by extrusion of the sheet material. However, the collar may also be a separate part welded to the common opening in the manifold.

The first sidewall 201 of the manifold 20 is welded to the edge 101 of the top side 100 along the common weld line 3. The second steeper sidewall 202 of the manifold is welded to the opposite edge 102 of the top side along another common weld line. The roof has a top angle 206 of 90 degree. Due to the larger first sidewall 201 of the manifold, the first sidewall and the top side 100 include a base angle 207 of about 20 degree to 30 degree, for example 25 degree. The second sidewall 202 and the top side 100 include a base angle 208 of about 70 degree to 80 degree, for example 75 degree. Apart from the collar 2040 around the common inlet opening 204, the first sidewall 201 and the second sidewall 202 are flat plates each extending in one single plane.

Figure 3:
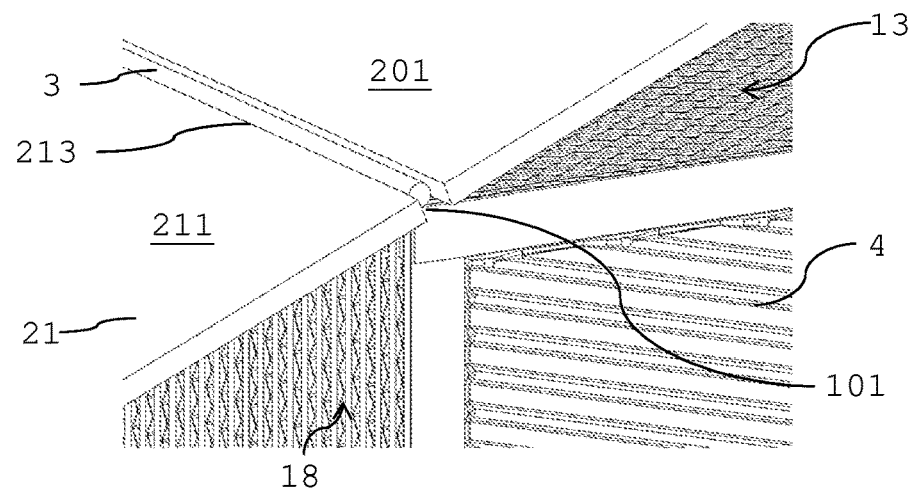
FIG. 3 shows a view of a common weld line of two manifolds and an edge of a heat exchanger core.

FIG. 3 shows a common weld line 3 of two manifolds and an edge of a heat exchanger core, for example as in FIG. 2.

As may be seen in FIG. 3, a first sidewall 211 of a second manifold 21 is welded along a connecting edge 213 of the second manifold 21 to the common weld line 3 of the first manifold 20 and the edge 101 of the heat exchanger core 1. The two first sidewalls 201,211 of the two manifolds are arranged in one plane. As may be seen in FIG. 4 in the overview, the second manifold 21 covers a second side 110 of the heat exchanger core. The common inlet 214 in the second manifold 21 forms a common inlet for a fluid flow to be directed into the inlet openings 15 of the second side 110. In the second manifold 21, the second sidewall 212 is larger than the first sidewall 211 guiding a second fluid from the common inlet 214 to the second side 110 of the heat exchanger core. The two common openings 204,214 are arranged in a same plane and allow access to the common openings from a same direction.

The second manifold 21 also has the form of a roof, wherein the smaller first sidewall 211 of the roof comprises the common inlet 214. The roof has a top angle of 90 degree. Due to the smaller first sidewall 211 of the second manifold and its steeper arrangement, the first sidewall and the second side 110 include a base angle of about 70 degree to 80 degree, for example 25 degree. The second sidewall 212 and the second side 110 include a base angle of about 20 degree to 30 degree, for example 25 degree.

FIG. 5 shows the heat exchanger core of FIG. 4 provided with four manifolds 20,21,22,23, each manifold covering one side 100,110,120,130 of the heat exchanger core 1. The first and third manifold 20,22 have a same shape and size and the second and fourth manifold 21,23 have a same shape and size. The third manifold 22 covers the third or bottom side 120 of the heat exchanger core 1. The fourth manifold 23 covers the fourth side 130 of the heat exchanger core 1. Each of the manifolds is welded to two edges of the heat exchanger core 1 and to their two neighbouring manifolds.

In FIG. 5, a thermal shield 5 is inserted in the volume created by the first manifold 20. The thermal shield 5 is a bended piece of sheet material forming a barrier between common inlet 204 and cover plate 16. The shield is arranged parallel to the first sidewall 201 of the first manifold 20 thus directing a fluid flow entering the common inlet 204 to the inlet port section 13. By the thermal shield 5 a direct contact between the fluid flow and the cover plate 16 is prevented or minimized. Thus, an unwanted heat exchange between a cool fluid and a typically hot cover plate 16 heated by a hot fluid may be minimized.

While such a thermal shield 5 is shown for the one manifold 20 only, only some or all of the manifolds may be provided with a thermal shield 5.

The two sides 140,150 of the heat exchanger core not comprising inlets or outlets are covered by side plates 28 as shown in FIG. 6 (back side not shown). The side plates 28 close the volume spanned by the manifolds 20,21,22,23. The side plates 28 are welded along their circumference, that is, along each of their four edges to the sides of the manifolds. By this a heat exchanger box is formed having a simple rectangular form comprising two common openings 204,214 on one side of the box and two common openings 224,234 on the opposite side of the box (see FIG. 5).

Figure 7:
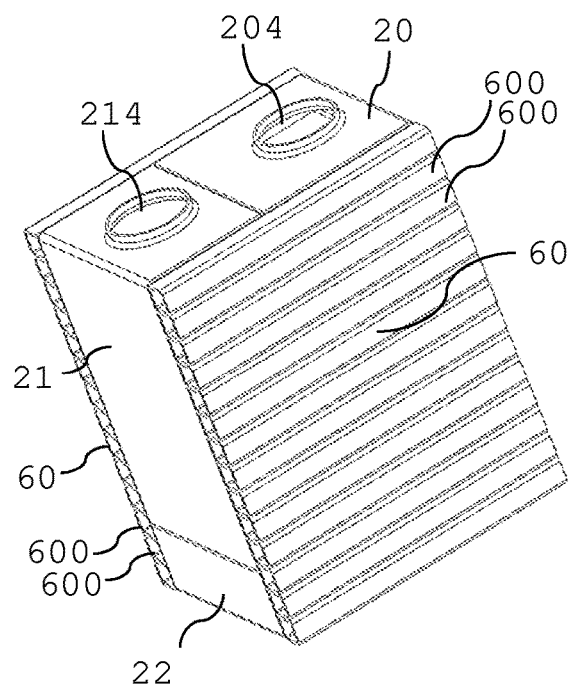
FIG. 7 shows the heat exchanger box of FIG. 6 with reinforcement and thermal insulation.
Figure 8:
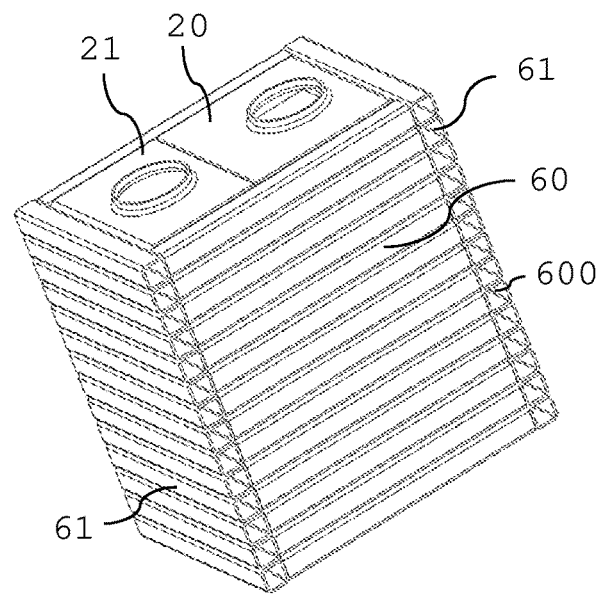
FIG. 8 shows the embodiment of FIG. 7 with further reinforcement.
Figure 9:
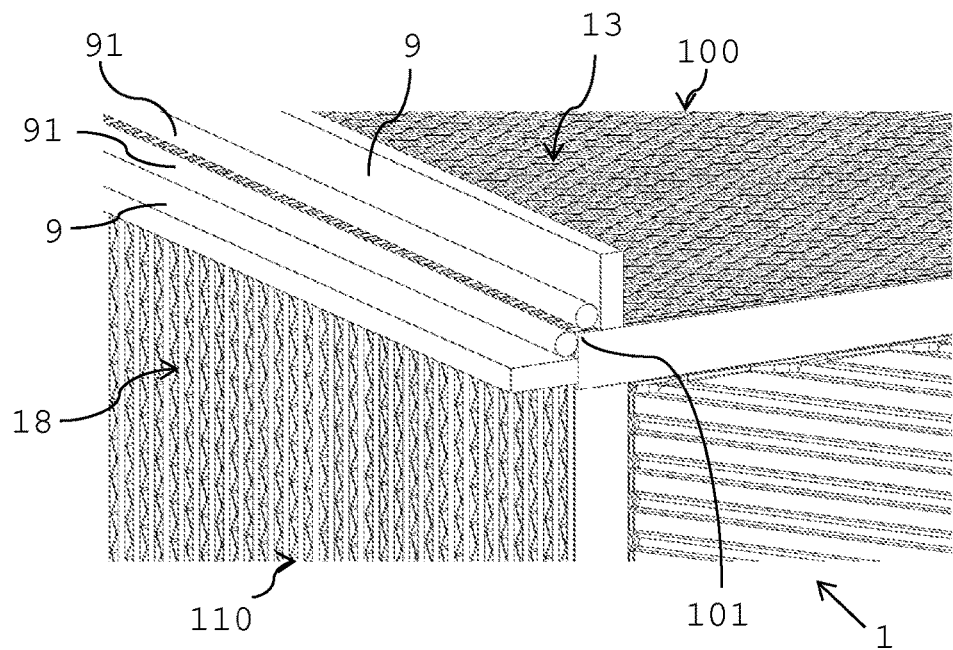
FIG. 9 is an example of a prior art welding of manifolds to a heat exchanger stack.

FIG. 7 and FIG. 8 show the heat exchanger box of FIG. 6 with reinforcements serving also as thermal insulation. In FIG. 7 the side plates 28 forming the large sides of the heat exchanger box are covered by a series of rectangular hollow tubes 600. The rectangular hollow tubes 600 form a wall 60 of rectangular hollow tubes 600 arranged in parallel. The rectangular hollow tubes 600 are preferably made of a mechanically stable material, which may be a metal but may, for example, also be a thermally insulating material. The hollow core of the rectangular hollow tubes 600 forms an air insulation and as such thermally insulates the heat exchanger. The interior of the rectangular hollow tubes 600 may also be filled with a thermally insulating material. In FIG. 8 also the two small sides of the heat exchanger box not comprising a common opening are provided with an array of rectangular hollow tubes 600. The tubes each form a wall 61 of rectangular hollow tubes 600. Also the walls 61 may be made of metal or of a thermally insulating material. The walls may provide an air insulation or may be filled with a thermally insulating material. Typically, reinforcements are provided if one or both fluid flows passing the heat exchanger have a pressure of or above 1.5 bar. The reinforcements as shown are advantageous for high pressure applications for example using a gas having a pressure above 3 bar, for example above 5 bar. FIG. 9 is an example of a known way of welding manifolds to a heat exchanger stack, for example to the heat exchanger stack described in EP 3 217 132.

Only plates 9 as parts of conventional manifolds covering the two sides 100,110 of the heat exchanger core 1 are shown. The plates are each arranged perpendicular to the corner part of the heat exchanger. The plates 9 are welded at the base of the manifold to the corner parts of the heat exchanger core 1. The two weld lines 91 shown may also be at the very base of the plates 9 or the manifold, respectively, or on the opposite base side of the plates 9 than shown in FIG. 9.

Next to the two weld lines 91 for attaching the manifolds to the heat exchanger core, an additional weld (not shown) is present along the edge 101 of the heat exchanger core in order to prevent a fluid flow entering the inlet port 18 from being mixed with a fluid flow entering inlet port 13.

Thus, three individual welds and welding steps are required. In addition, the perpendicular arrangement of the plates 9 and manifolds does not allow to construct very simple manifolds and heat exchangers shapes.

The invention has mainly been described in combination with embodiments of a heat exchanger as disclosed in EP 3 217 132. Such a combination is in particular advantageous as described above. However, the special design and arrangement of one or in particular of four manifolds also allows a favourable combination with different heat exchangers not explicitly mentioned in the application. Preferably, heat exchanger stacks comprising inlet openings and outlet openings arranged at different sides of the stack are generally suited and preferably chosen for being provided with a manifold according to the method of the invention.

The invention claimed is:

1. A method for manufacturing a heat exchanger comprising:
   a heat exchanger core; and
   a manifold;
   wherein the heat exchanger core comprises a stack of heat transfer plates with spacing elements arranged between the heat transfer plates; and wherein the heat exchanger core has four edges extending along and formed by the stack of heat transfer plates with the spacing elements in between;
   the method comprising:
   providing the stack of heat transfer plates, with the heat transfer plates extending in a general plane and each comprising four edge parts;
   providing first flow channels and second flow channels between the heat transfer plates by arranging the spacing elements between the heat transfer plates, the spacing elements extending along the four edge parts of the heat transfer plates leaving open first inlets, first outlets, second inlets, and second outlets, each arranged on four different sides of the heat exchanger core;
   welding the spacing elements to the heat transfer plates along the four edge parts, thereby forming the heat exchanger core;
   providing the manifold and covering one side of the four different sides of the heat exchanger core with the manifold; and
   welding a connecting edge of a first sidewall of the manifold to one of the four edges of the heat exchanger core such that an angle of less than 90 degrees is formed between the first sidewall of the manifold and the one side of the four different sides of the heat exchanger core, thereby welding the heat exchanger core along the one of the four edges and forming a common weld line with the connecting edge of the manifold.

2. The method according to claim 1, further comprising the steps of:

providing a further manifold covering a second, neighbouring side of the four different sides of the heat exchanger core with the further manifold; and welding a connecting edge of the further manifold to the connecting edge of the manifold and to the one of the four edges of the heat exchanger core, thereby forming the common weld line between the manifold, further manifold and the one edge of the heat exchanger core.

3. The method according to claim 2, further comprising the steps of:

providing four manifolds;

covering each one of the four different sides of the heat exchanger core with one of the four manifolds; and welding each two of connecting edges of manifolds to each other and to one of the four edges of the heat exchanger core.

4. The method according to claim 2, further comprising a step of arranging a first sidewall of the further manifold at an angle smaller than 90 degree to a second side of the heat exchanger core which is covered by the further manifold.

5. The method according to claim 2, further comprising a step of arranging a first sidewall of the manifold and a first sidewall of the further manifold in a same plane.

6. The method according to claim 1, further comprising the steps of:

providing four manifolds;

covering each one of the four different sides of the heat exchanger core with one of the four manifolds; and welding each two of connecting edges of manifolds to each other and to one of the four edges of the heat exchanger core.

7. The method according to claim 6, further comprising the steps of:

arranging and designing the four manifolds around the heat exchanger core thereby forming a heat exchanger box comprising a common opening in each of the four manifolds, and arranging two common openings on one side of the heat exchanger box and two further common openings on an opposite side of the heat exchanger box.

8. The method according to claim 1, wherein the manifold has an asymmetric triangle cross-section.

9. The method according to claim 1, further comprising a step of thermally insulating the heat exchanger core.

10. The method according to claim 9, wherein thermally insulating comprises providing a thermal insulation between the manifold and the side of the heat exchanger core covered by the manifold.

* * * * *